(12) United States Patent
Bryan-Brown et al.

(10) Patent No.: US 11,994,765 B2
(45) Date of Patent: May 28, 2024

(54) DISPLAY WITH POLARIZATION DEPENDENT DIFFUSIVE PROPERTIES

(71) Applicant: New Vision Display, Inc., Roseville, CA (US)

(72) Inventors: Guy P. Bryan-Brown, Malvern (GB); Richard M. Amos, Malvern (GB); Emma L. Graham, Malvern (GB); Matthias T. Pfeiffer, Boulder, CO (US)

(73) Assignee: New Vision Display, Inc., Roseville, CA (US)

( * ) Notice: Subject to any disclaimer, the term of this patent is extended or adjusted under 35 U.S.C. 154(b) by 0 days.

(21) Appl. No.: 18/072,078

(22) Filed: Nov. 30, 2022

(65) Prior Publication Data

US 2023/0168537 A1    Jun. 1, 2023

Related U.S. Application Data

(60) Provisional application No. 63/284,814, filed on Dec. 1, 2021.

(51) Int. Cl.
*G02F 1/1335* (2006.01)
*G02F 1/139* (2006.01)

(52) U.S. Cl.
CPC .. *G02F 1/133536* (2013.01); *G02F 1/133504* (2013.01); *G02F 1/133553* (2013.01); *G02F 1/1391* (2013.01)

(58) Field of Classification Search
CPC .................................................. G02F 1/133536
See application file for complete search history.

(56) References Cited

U.S. PATENT DOCUMENTS

| | | | |
|---|---|---|---|
| 3,905,682 A | 9/1975 | Meyerhofer | |
| 6,024,455 A | 2/2000 | O'Neill | |
| 11,592,701 B2 * | 2/2023 | Garbar | G02F 1/133624 |
| 2018/0067250 A1 * | 3/2018 | Nakamura | G02F 1/133528 |
| 2023/0044071 A1 * | 2/2023 | Pfeiffer | G02F 1/133512 |

* cited by examiner

*Primary Examiner* — Edmond C Lau
(74) *Attorney, Agent, or Firm* — Weintraub Tobin; Jo Carothers

(57) ABSTRACT

Systems, apparatuses, and methods for an electronic display are disclosed. More specifically, the invention and disclosure relates to an electronic display that has a diffuse, paper-like reflectance characteristic for visible light, while being retroreflective and non-diffuse for infrared light, for easy image detection and analysis with infrared cameras, while preserving viewing properties of an electronic paper display for humans.

16 Claims, 13 Drawing Sheets

DISPLAY WITH POLARIZATION DEPENDENT DIFFUSIVE PROPERTIES

CROSS-REFERENCE TO RELATED APPLICATION

This application claims priority under 35 U.S.C. Section 119(e) to U.S. Provisional Patent Application No. 63/284,814, entitled "Display with Polarization Dependent Diffusive Properties" and filed on Dec. 1, 2021, the entire disclosure of which is incorporated herein by reference.

FIELD OF THE INVENTION

The present invention and disclosure relate to an electronic display in which the path and angular distribution of the reflected light is different in visible and infrared wavebands.

BACKGROUND OF THE INVENTION

Reflective electronic liquid crystal displays ("LCDs") may be based on liquid crystal cells in which the electrodes on the rear surface are reflective. A single front polarizer, retardation, and diffuser layer is added in order to achieve contrast between the various voltage-induced arrangements of the liquid crystal within the cell. Such an arrangement is called single-polarizer mode. Alternatively, reflective LCDs may comprise liquid crystal cells in which both front and back electrodes are transparent. In this case an extra rear polarizer is added that typically contains diffuser, polarizer, and reflector layers. This configuration is sometimes referred to as two-polarizer mode. Both display types can employ single or multilayer retardation films in order to enhance the viewing angle properties of the LCD.

Single-polarizer modes have the advantage of higher reflectivity and lack of pixel parallax, or shadow cast on the reflector from the display pixel. However, the patterned reflective electrode in such displays is non-standard on many LCD productions lines. Furthermore, single polarizer modes require a smaller cell gap or lower birefringence liquid crystal than two-polarizer modes, which can affect production yield and cost. Hence for many products, two-polarizer modes are preferred.

Diffusion of incident light is essential for both these types of electronic displays in order to avoid a specular metallic appearance. Many types of diffusers exist including surface diffusers, volume beaded diffusers, and volume structural diffusers. Diffusers can be selected to impart a paper-like look to the display, which then is referred to as an e-paper display.

For each display application, the diffuser type is optimized to best match the illumination and viewing conditions that are likely to be present. In some display applications, many different illumination and viewing conditions can be encountered by the display. This inevitably leads to display designs which provide the best compromise in properties across the range of viewing conditions.

In many applications, a reflected display needs to be viewed by both people and cameras. In the former case, it is desirable to take ambient illumination, such as daylight or other artificial lighting sources, and reflect it most efficiently towards the viewer who might be located in a variety of different orientations with respect to the display surface. A display with a Lambertian diffusion characteristic gives the most paper-like appearance, however a more pleasant viewing experience may be achieved with engineered diffusers that send light only in the directions from which a display may be viewed, while avoiding an unnecessary reduction in brightness from sending light in directions where it would be wasted.

Many camera systems control the illumination conditions with built-in self-contained illumination sources (for example electronic flashes) and will usually be located in an off-axis orientation with respect to the display surface. In this case, it is desirable to have a retroreflective element incorporated into the display to maximize the brightness of the reflection back towards the camera regardless of its orientation. However, this retroreflection illumination works best if there is no diffusion of the light. Enough diffusiveness for a pleasing appearance of the display for a human observer is far too much for a camera system relying on retroreflected light from its own source.

Retroreflective LCDs are described in U.S. Pat. No. 3,905,682 (Meyerhofer). While being optimum for camera viewing, these designs have poor viewing properties when viewed by people in ambient lighting conditions.

U.S. Pat. No. 6,024,455 (O'Neill et al.) describes a patterned retroreflective layer covered by a multilayer material stack capable of separating light of different wavelength bands to create "reflective articles bearing indicia." While this design allows adding static, hidden information to a reflective article that only becomes visible under certain viewing conditions, it is not a display device and as such cannot change that information, nor does it incorporate the use of polarized light to create a bright versus dark contrast or a color contrast.

Thus, there is a need for a display that can simultaneously satisfy two opposing requirements for different viewing conditions using a single, fixed design of optical layers and without having to compromise performance in either of these viewing conditions.

BRIEF SUMMARY OF THE INVENTION

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

This invention discloses a display for both human and camera viewing simultaneously by separating the path that light takes from the source via the display to the observer or camera based on the wavelength band of the light and its polarization state.

For human-readable information, the reflectivity of the electronic display in the visible wavelength range of about 400 nanometers to about 700 nanometers is important. In contrast, many camera systems operate with illumination outside this range, typically in an infrared range between about 700 nanometers and about 1100 nanometers. This distinction is particularly important for automatic license plate recognition (ALPR) systems where cameras emit high-speed flashes of illumination in order to avoid image blurring when the vehicle is in motion. Such flashes would disturb the driver if they were in the visible optical range. The invention and disclosure also has the advantage that expensive infrared polarizers only have to cover the small area of the infrared camera's light sources instead of having to be placed across the whole area of the license plate.

This invention discloses an electronic display configuration that can simultaneously achieve diffuse reflection required for human viewing in the visible light range while also allowing retroreflective appearance when illuminated by light in the infrared range for sensing by an infrared camera system. Thus, the electronic display can be both retroreflective and non-retroreflective. The electronic display is using elements that behave differently in the visible and infrared ranges and combining them such that the display changes reflectivity characteristics as a function of the wavelength of the incident light.

Accordingly, one or more embodiments of the present invention overcomes one or more of the shortcomings of the known prior art.

For example, in one embodiment, an electronic display is disclosed that is diffuse reflective to visible light and non-diffuse retro-reflective to infrared light comprising a plurality of optical layers, the plurality of optical layers comprising: a front polarizer for polarizing visible light incident on the electronic display and for polarizing infrared light incident on the electronic display; a liquid crystal layer comprising a plurality of liquid crystals, wherein: the liquid crystal layer introduces a plurality of retardation levels in the visible light; and the liquid crystal layer introduces a plurality of retardation levels in the infrared light; a transmissive diffuser layer, wherein: the transmissive diffuser layer diffuses visible light having a first polarization and diffuses infrared light having the first polarization; the transmissive diffuser layer does not diffuse visible light having a second polarization and does not diffuse infrared light having the second polarization; and the second polarization is orthogonal to the first polarization; a reflective rear polarizer for transmitting the first polarization and reflecting the second polarization; an absorption layer; wherein: the absorption layer is transparent to infrared light; and the absorption layer is opaque to visible light; and a retroreflecting layer; wherein the retroreflecting layer reflects visible light and reflects infrared light.

In this embodiment, the electronic display can further comprise wherein: the visible light has a spectral range of greater than or equal to 400 nanometers and less than or equal to 700 nanometers, and the infrared light has a spectral range of greater than or equal to 700 nanometers and less than or equal to 1100 nanometers; wherein the front polarizer further comprises: a visible light absorbing polarizer, a visible infrared reflective transmissive polarizer, and wherein the visible light absorbing polarizer is located in front of the visible infrared reflective transmissive polarizer; wherein the liquid crystal layer operates using a monostable mode; wherein the liquid crystal layer operates using a bistable mode; wherein the liquid crystal layer operates using a multistable mode; wherein the absorption layer contains a dye that is opaque to visible light; wherein the absorption layer comprises an absorbing polarizer, and wherein the absorbing polarizer is oriented with a transmission axis orthogonal to a transmission axis of the reflective rear polarizer; wherein the retroreflecting layer further comprises a plurality of dielectric stacks; wherein the retroreflecting layer comprises a plurality of corner-cube reflectors with total internal reflection; wherein the retroreflecting layer comprises a plurality of corner-cube reflectors with mirrored surfaces; wherein the retroreflecting layer comprises a plurality of microsphere reflectors with total internal reflection; wherein the retroreflecting layer comprises a plurality of microsphere reflector with mirrored surfaces; wherein the retroreflecting layer comprises a plurality of hemisphere reflectors employing total internal reflection; or wherein the retroreflecting layer comprises a plurality of hemisphere reflectors with mirrored surfaces; wherein: the front polarizer is a visible light polarizer, the reflective rear polarizer is a visible light polarizer, and the electronic display is illuminated with a polarized light from an automatic license plate recognition system.

In another example embodiment, an electronic display device is disclosed comprising: a first contrast, wherein the first contrast is operated with visible light; a second contrast, wherein the second contrast is operated with infrared light; and wherein the second contrast is substantially the inverse of the first contrast as would be understood by one of skill in the art. In a further embodiment, the first contrast and the second contrast occur simultaneously.

In another example embodiment, a method for forming an electronic display that is diffuse reflective to visible light and non-diffuse retro-reflective to infrared light is disclosed comprising: providing a front polarizer comprising a first side and a second side; providing a liquid crystal layer comprising a plurality of liquid crystals, a first glass plate comprising an inner surface and an outer surface, a second glass plate comprising an inner surface and an outer surface, and wherein the plurality of liquid crystals are located between the inner surface of the first glass plate and the inner surface of the second glass plate; adhering the outer surface of the first glass plate of the liquid crystal layer to the second side of the front polarizer; providing a diffuser comprising: a first side and a second side and wherein the diffuser diffuses visible light having a first polarization and diffuses infrared light having the first polarization and wherein the diffuser does not diffuse visible light having a second polarization and does not diffuse infrared light having the second polarization, and wherein the first polarization is orthogonal to the second polarization; adhering the first side of the diffuser to the outer surface of the second glass plate of the liquid crystal layer; providing a rear polarizer for transmitting the first polarization and reflecting the second polarization comprising a first side; and a second side; adhering the first side of the rear polarizer to the second side of the diffuser; providing an absorption layer comprising a first side, a second side, and wherein the absorption layer absorbs visible light and transmits infrared light; adhering the first side of the absorption layer to the second side of the rear polarizer; providing a retroreflecting layer comprising a first side, a second side, and wherein the retroreflecting layer does not depolarize visible light and infrared light; and adhering the first side of the retroreflecting layer on the second side of the absorption layer.

Other objects, features, and advantages of the present invention will become apparent upon consideration of the following detailed description and the accompanying drawings.

DETAILED DESCRIPTION OF THE INVENTION

The following is a detailed description of embodiments to illustrate the principles of the invention. The embodiments are provided to illustrate aspects of the invention, but the invention is not limited to any embodiment. The scope of the invention encompasses numerous alternatives, modifications, and equivalents. The scope of the invention is limited only by the claims.

While numerous specific details are set forth in the following description to provide a thorough understanding of the invention, the invention may be practiced according to the claims without some or all of these specific details.

Various embodiments will be described in detail with reference to the accompanying drawings. Wherever possible, the same reference numbers are used throughout the drawings to refer to the same or like parts. References made to particular examples and implementations are for illustrative purposes and are not intended to limit the scope of the claims.

In the description below, the phrases "optical" and "light" are used to describe both visible and infrared wavelengths. In addition, opaque does not mean complete 100% absorption of light, and transparent does not meet complete 100% transmission of light. Transparent means greater than 60% transmission and opaque means less than 40% transmission. However, in an optimal case, transparent could be greater than 90% transmission and opaque could be less than 10% transmission, or even less if achievable. In addition, with respect to polarizer orientation, orthogonal or substantially orthogonal means 90 degrees plus or minus 5 degrees) (90°+/−5°. Further, while it is desirable to minimize diffusion for polarization where diffusion is undesirable, complete elimination of diffusion is not typically possible. Similarly, while retroreflectors do not substantially depolarize light and it is desirable to minimize the amount of depolarization, a retroreflector does not achieve 100% non-depolarization as one of skill in the art understands.

Figure 1:
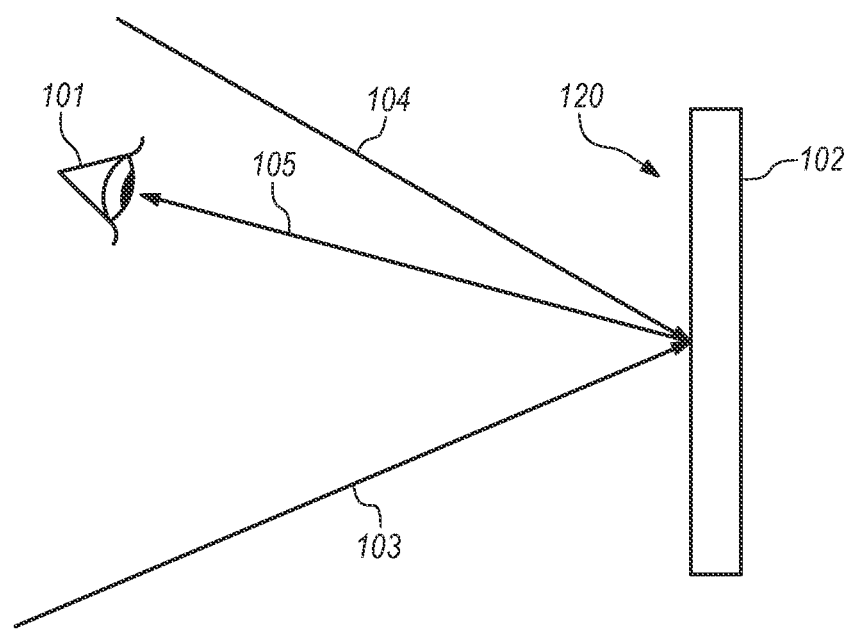
FIG. 1 shows an electronic display being viewed by a human in ambient illumination conditions.

FIG. 1 shows electronic display 102 in ambient illumination conditions in which visible light falls onto electronic display 102 from many different directions, for example from light directions 103 and 104. Electronic display 102 is designed to allow diffuse reflection of reflected light 105 in a direction towards human viewer 101. However, in addition to the orientation shown in FIG. 1 for human viewer 101 viewing reflected light 105, human viewer 101 could be located in numerous other orientations with respect to front surface 120 of electronic display 102 while viewing numerous other beams of reflected light 105.

Figure 2:
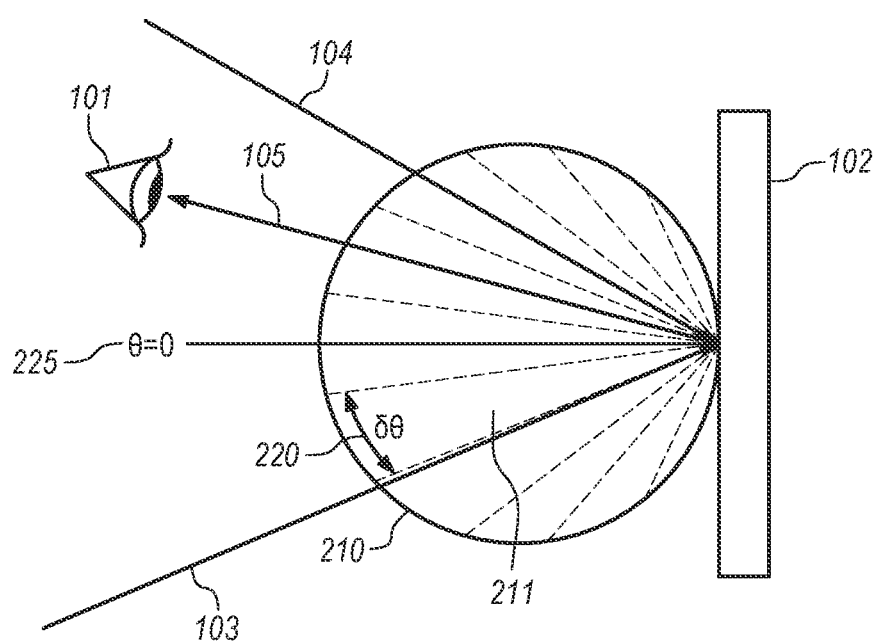
FIG. 2 illustrates the reflection characteristics of an idealized Lambertian display.

FIG. 2 illustrates the Lambertian reflectance characteristics 210 of electronic display 102 when electronic display 102 is assumed to have near perfect Lambertian reflectance characteristics 210. Independent of where the incoming light 103 and 104 originates from, electronic display 102 will reflect reflected light 105 into the entire hemisphere above its surface. The amount of reflected light 105 from electronic display 102 into an angular range 220 is proportional to the area of a slice 211 defined by the angular range 220.

Most reflected light 105 gets reflected into angle 225, which is close to zero degrees, and the larger the angle 225 is away from normal incidence at zero degrees, the less reflected light 105 is reflected into the angular range 220. However, human viewer 101 looking at electronic display 102 sees the apparent area of electronic display 102 shrinking with increasing angle 225. The shrinking of the apparent area of electronic display 102 with increasing angle 225 and the reduction of the amount of light reflected into the respective angular range 220 around that increasing angle 225 happen at the same rate. Therefore, human viewer 101 sees the same amount of light 105 per unit area of front surface 120 of electronic display 102 no matter from what direction electronic display 102 is viewed. This is perceived by the human viewer as electronic display 102 having the same brightness when being viewed from any direction.

Generally during real-world application, electronic display 102 does not have perfect Lambertian reflectance characteristics 210. However, deviations from the Lambertian reflectance characteristics 210 behavior are averaged out because incoming light 103 and 104 impinging on the electronic display 102 comes from many different directions in the environment. Therefore, electronic display 102 as shown in FIG. 2 with Lambertian reflectance characteristics 210 is a good model for a paper-like display appearance.

Figure 3:
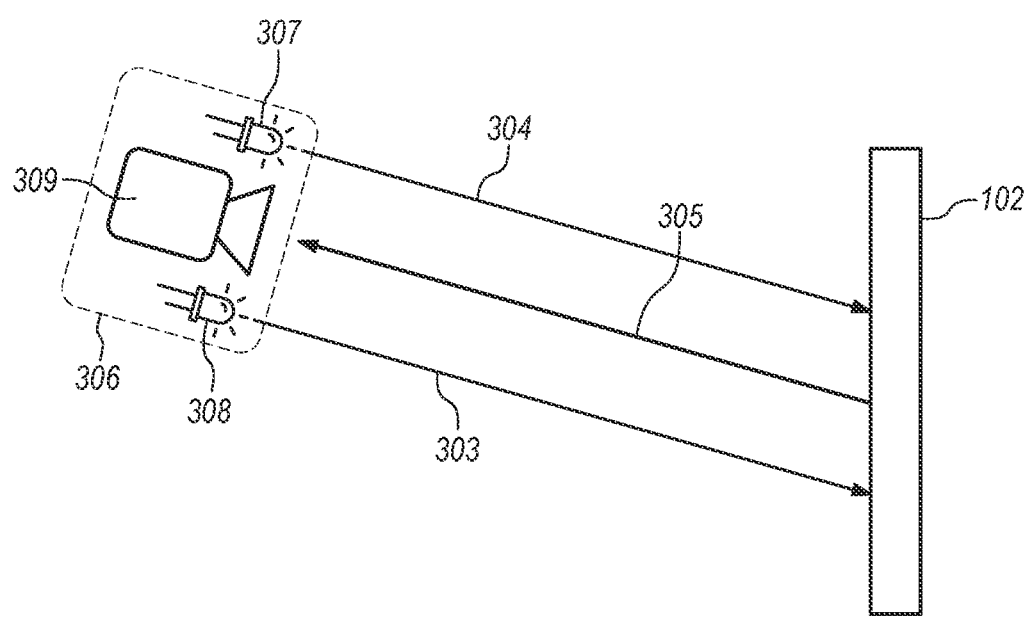
FIG. 3 shows an electronic display being viewed by a camera system that also contains illumination sources.

FIG. 3 shows electronic display 102 viewed and illuminated by camera system 306 comprising infrared light sources 307 and 308 and infrared sensitive camera 309. In one embodiment, infrared light sources 307 and 308 may have emission wavelengths in the range of greater than or equal to 700 nanometers and less than or equal to 1100 nanometers, especially in automated license plate reader (ALPR) systems so that when light sources 307 and 308 flash, the flashes do not disturb drivers. Infrared sensitive camera 309 may include a bandpass filter so that it is only sensitive at wavelengths matching infrared light sources 307 and 308. This minimizes the effect of any stray light sources that might compromise the ALPR image quality. To image electronic display 102, content light 305 originates only from the camera system 306 as light 303 and 304. This is referred to as coaxial illumination.

Figure 4:
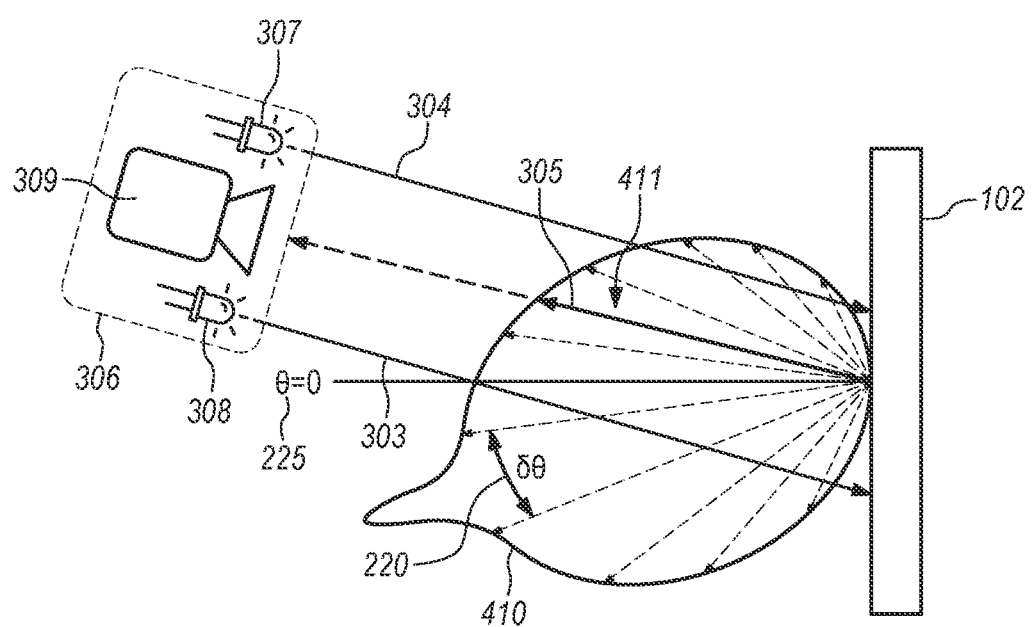
FIG. 4 illustrates the reflection characteristics of a near ideal Lambertian display with a small specular reflection component.

FIG. 4 illustrates coaxial illumination of electronic display 102 having a near Lambertian reflectance characteristic 210 (FIG. 2) plus additional specular reflectance component 410. Since the light impinging on electronic display 102 originates only from one direction, deviations from the Lambertian reflectance characteristics 210 are not averaged out. Light 303 and 304 impinges on electronic display 102 only from the direction of the camera 309. Content light 305 is reflected and distributed into the entire hemisphere with slightly more content light 305 going into the specular angle range 220. The content light 305 returned to camera 309 through the angular range slice 411 is only a small fraction of light 303 and 304 that came from camera 309. As a result, the image of electronic display 102 looks dim and may not be recognizable by cameras with image recognition.

Figure 5:
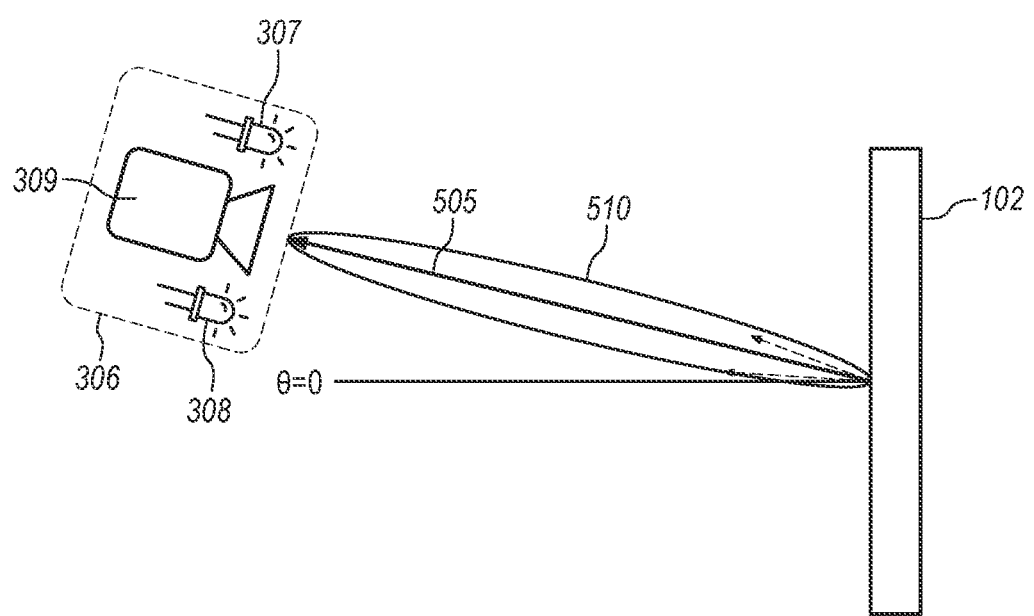
FIG. 5 illustrates the reflection characteristics of an electronic display with retroreflective properties.

Reflective display 102 as shown in FIG. 4 must deliver maximum reflectivity for the off-axis illumination camera system 306. For this to occur, electronic display 102 should preferably have reflectance characteristic 510 as illustrated in FIG. 5. The ideal reflectance characteristic 510 for coaxial viewing is very different from the Lambertian reflectance characteristic 210 ideal for human viewer 101. The long and narrow reflectance coil directed towards the light source in camera system 306 means a high degree of retro reflectivity combined with a low degree of diffusion and a low degree of specular reflectivity.

Therefore, the ideal electronic display 102 for both human viewer 101 and camera system 306 observation is simultaneously highly diffusive and non-diffusive as well as highly retroreflective and non-retroreflective.

Figure 6:
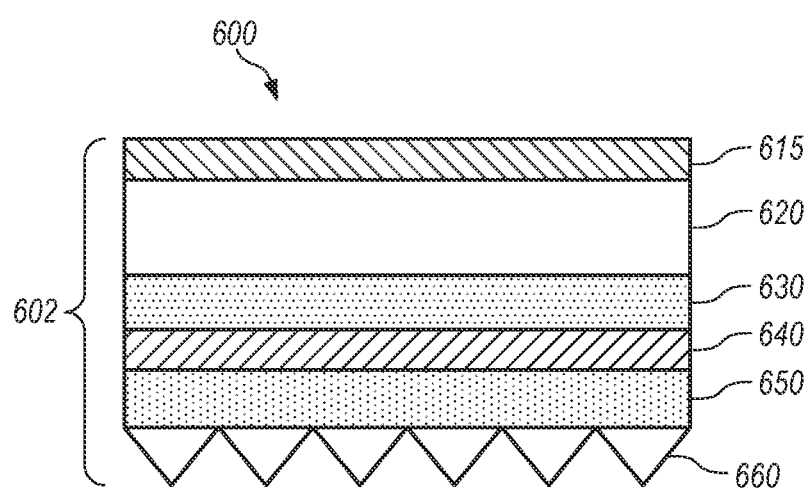
FIG. 6 shows a cross section of one exemplary embodiment of an electronic display of the invention.

FIG. 6 shows an example embodiment of cross section 602 of a configuration of electronic display 600 that simultaneously achieves the best viewing characteristics for both human viewer 101 and camera system 306 observation as shown in FIGS. 1-5 by controlling the light path both as a function of wavelength and of polarization. Cross section 602 comprises various optical layers including front polarizer 615, liquid crystal layer 620, transmissive diffuser layer 630, rear polarizer 640, absorption layer 650, and retroreflecting layer 660.

Front polarizer 615 of electronic display 600 in FIG. 6 is capable of polarizing both visible and infrared light. In one embodiment, front polarizer 615 may be a special component, or it may be made up of a visible light absorbing type polarizer on top of a visible-infrared reflective-transmissive polarizer. Examples of absorbing type polarizers are described in for example U.S. Pat. No. 10,007,142. Examples of visible-infrared polarizers include WGF material supplied by Asahi Kasei (described in JP2008083656A) or DBEF material supplied by 3M (described in U.S. Pat. No. 5,686,979).

The absorbing layer of front polarizer 615 is required in front of the reflective-transmissive layer of front polarizer 615 to prevent unwanted specular reflection from the front surface of the front polarizer 615 when viewed in visible light by a human, as this would impart a metallic mirror-like appearance to the electronic display 600. This specular front surface reflection is present in infrared camera viewing but is inconsequential for the image quality as the unwanted polarization component of incoming light 303 and 304 is reflected away from camera 309 as long as camera 309 is not positioned at normal incidence.

Liquid crystal layer 620 is capable of inducing at least two different retardation levels in both incident visible and infrared light. The LCD mode used in liquid crystal layer 620 might be a monostable mode such as Twisted Nematic (TN), Super Twisted Nematic (STN), In Plane Switching (IPS), Multidomain Vertically Aligned (MVA) or other such modes familiar to one of skill in the art. Alternatively, the LCD mode might be a bistable or multistable mode such as Zenithal Bistable Display (ZBD), Binem, Cholesteric liquid crystal, Surface Stabilized Ferroelectric Liquid Crystal (SSFLC), or other such modes. The mode is the combination of materials, alignment, liquid crystal director configuration in on and off state, polarizer configuration and orientation and configuration of other optical elements that are present.

Below liquid crystal layer 620 is transmissive diffuser layer 630 which diffuses both visible and infrared light of one polarization but shows little or no diffusion of the orthogonal polarization. This polarization selective diffusion (PSD) transmissive diffuser layer 630 can be formed by many methods known to those of skill in the art. One example is a stretched polymer dispersed liquid crystal (PDLC) material as described by Egamov et al (DOI: 10.1364/JOT.81.000414). Other surface or volume diffuser materials familiar to one of skill in the art can be used to form transmissive diffuser layer 630. As well as having polarization selective diffusion, transmissive diffuser layer 630 should not depolarize incident light and should mainly induce forward scattering. The amount of light that is backscattered by transmissive diffuser layer 630 should be minimized in order to ensure optimum device operation.

Under transmissive diffuser layer 630 is rear polarizer 640 that can comprise a wire grid polarizer (WGP) or dual brightness enhancement film (DBEF) material in one exemplary embodiment. In this embodiment, a reflective rear polarizer 640 is required for electronic display 600, but an absorbing rear polarizer 640 is not required. Below rear polarizer 640 is absorption layer 650, which absorbs visible light but is transparent in the infrared. In one embodiment, absorption layer 650 is formed from injection molding, film extrusion, printing, or some other layer formation method. In another embodiment, absorption layer can comprise a visible opaque dye material. Examples of visible opaque dye materials include Epolight 7527A and Epolight 7276B (Epolin, NJ, USA). Absorption layer 650 can appear black in the visible range imparting a black and white contrast or it can be colored. For example, absorption layer 650 may appear blue in the visible range imparting a blue and white contrast.

The bottom layer in cross section 602 of electronic display 600 is retroreflecting layer 660. In one embodiment, retroreflecting layer 660 can comprise corner cube reflectors, such as those described in, for example, U.S. Pat. No. 4,588,258 (Hoopman), U.S. Pat. No. 4,775,219 (Appledorn et al), and U.S. Pat. No. 5,138,488 (Szczech). In other embodiments, retroreflecting layer 660 may comprise microspheres or hemispheres, such as described in, for example, U.S. Pat. No. 3,190,178 (McKenzie) and U.S. Pat. No. 4,025,159 (McGrath).

Both types of retroreflectors may be based on total internal reflection or may be based on reflection from metallized surfaces, or dielectric stacks designed to provide high surface reflectivity. Metallized and dielectric stack materials are examples of mirrored surfaces. Retroreflecting layer 660 does not significantly depolarize the light because it is important to avoid unnecessary light losses. Mirrored front surfaces may provide an advantage as they allow the use of birefringent polymers to create the structures of the retroreflector.

Figure 7:
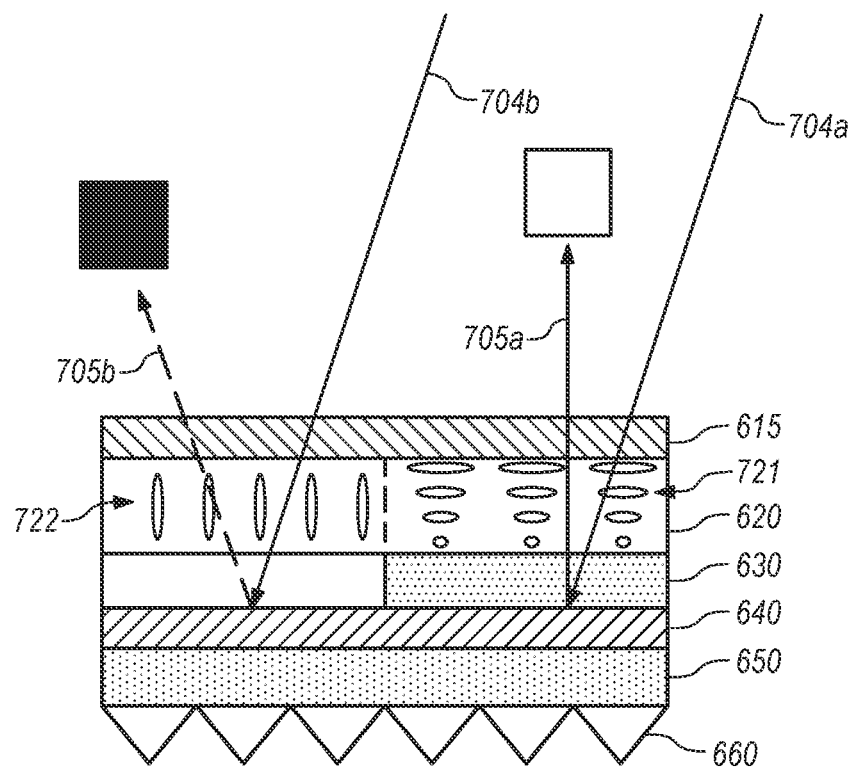
FIG. 7 shows the operation of one exemplary embodiment of an electronic display of the invention in the visible waveband.
Figure 8:
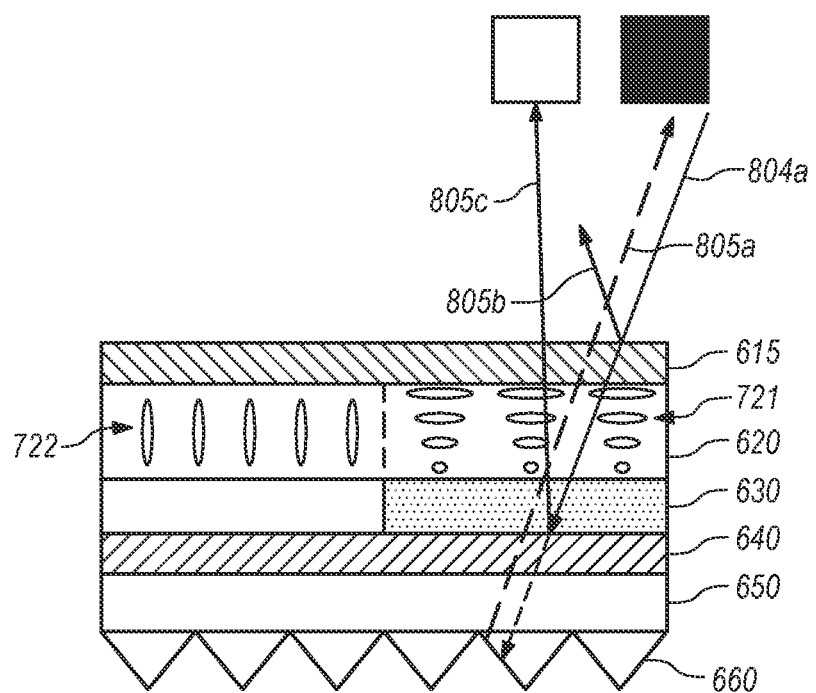
FIG. 8 shows an example embodiment of the reflectivity of infrared light incident on the region of a liquid crystal layer in a TN configuration.
Figure 9:
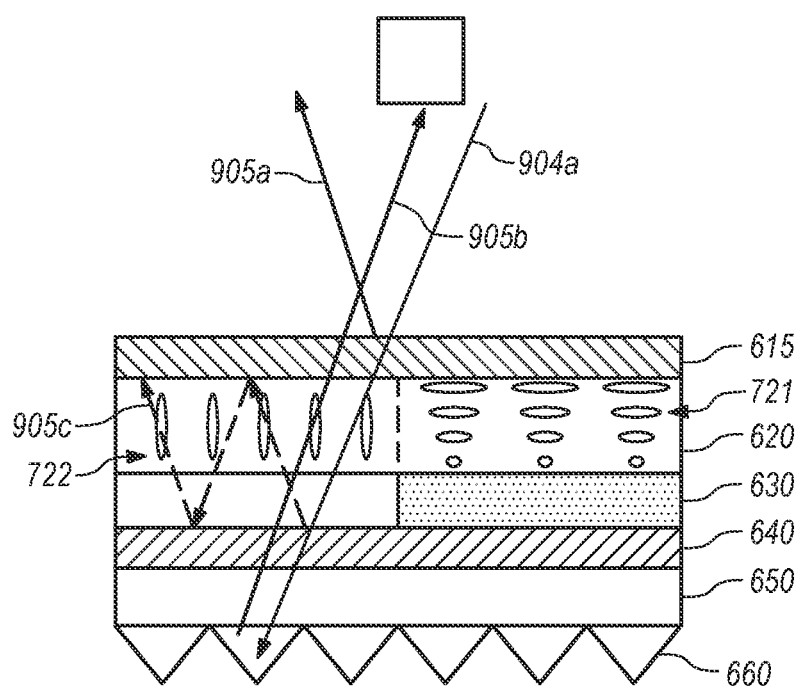
FIG. 9 shows an example embodiment of the reflectivity of light incident on the region of a liquid crystal layer in a VAN configuration.

FIGS. 7-9 illustrate the operation of front polarizer 615, liquid crystal layer 620, transmissive diffuser layer 630, rear polarizer 640, absorption layer 650, and retroreflecting layer 660 in the visible and infrared spectral regions. FIG. 7 shows the operation of one embodiment of electronic display 600 in the visible wavelength range. In this embodiment, the transmission polarization axis of the front polarizer 615 is oriented perpendicular to the reflected polarization axis of the rear polarizer 640. Liquid crystal layer 620 further comprises two liquid crystal configurations, twisted nematic, or TN configuration, 721 and vertically aligned nematic, or VAN configuration, 722.

The TN configuration 721 imposes retardation on the incident light 704a such that it is diffused by transmissive diffuser layer 630 and reflected by the rear polarizer 640. Both the incident light 704a and the reflected light 705a pass the transmissive diffuser layer 630 which impart the paper like reflectance quality for the observer. Upon passing the liquid crystal layer 620 in its TN configuration 721, further retardation is imposed on the reflected light 705a such that it can pass the front polarizer 615 and is seen as a bright pixel in the electronic display 600, when viewed from many different viewing directions.

The VAN configuration 722 imposes little or no retardation to the incident light 704b such that it passes through the transmissive diffuser layer 630 substantially without diffusion and to the minimum extent of diffusion as possible as would be understood by one of skill in the art. The light is then transmitted through the rear polarizer 640 and absorbed in the absorption layer 650. None or very little of light 705b is reflected causing the corresponding areas of the electronic display 600 to appear dark. Since transmissive diffuser layer 630 is diffuse in combination with the TN configuration 721, the reflected light 705a will have a range of reflection angles with respect to the angle of the incident light 704a. Thus, electronic display 600 has the appearance of a paper-like reflective LCD.

The operation of this exemplary embodiment of electronic display 600 in the infrared wavelength range is further shown in FIGS. 8 and 9. FIG. 8 shows the reflectivity of infrared light 804a incident on liquid crystal layer 620 in TN configuration 721. Because the absorptive part of front polarizer 615 is transmissive to infrared wavelengths, the light is polarized at the reflective portion of front polarizer 615. Half of the light, meaning one polarization state, is reflected into the specular angle as light 805b. The other half of the incident light 804a with an orthogonal polarization state passes through the front polarizer 615 and the liquid crystal layer 620 in TN configuration 721, which imposes retardation such that its polarization state is changed. The light then passes through the transmissive diffuser layer 630 such that it is diffused. The light is then mostly reflected by the rear polarizer 640 and diffused further by transmissive diffuser layer 630 to produce reflected light 805c by the rear polarizer 640.

None or only very little light has the polarization state that can transmit through the rear polarizer 640. This low level of transmitted light passes through the absorption layer 650, which is transparent for infrared light. It is then retroreflected from the retroreflecting layer 660 and this low light level 805a is returned towards the direction of the incident light 804a.

Thus, camera system 306 that illuminates incident light 804a and detects light 805a will record the corresponding region of electronic display 600 as a dark area. The electronic display 600 also reflects bright light 805b and 805c. However, these are not seen as bright reflection by the camera system 306 because bright light 805b is reflected only in the specular direction and bright light 805c is diffusely reflected which leads to minimal brightness in the direction of the camera. Bright light 805b and 805c are also not visible to a human viewer and so are of no consequence.

FIG. 9 shows the reflectivity of incident light 904a incident on the region of the liquid crystal layer 620 in VAN configuration 722. The incident light 904a is polarized at the reflective portion of the front polarizer 615. Half of incident light 904a with a first polarization state is reflected as light 905a, the other half of incident light 904a with the orthogonal polarization state passes through the liquid crystal layer 620 in VAN configuration 722, which induces almost no change in the polarization state of incident light 904a. This unchanged polarization state then allows incident light 904a to pass through the transmissive diffuser layer 630 substantially without experiencing diffusion. Incident light 904a then passes through the rear polarizer 640 and the absorption layer 650 before encountering the retroreflector layer 660, where incident light 904a is turned back towards the source as light 905b, following the same path backwards. This retroreflective light 905b suffers little or no diffusion during its return path, hence the corresponding pixel appears bright to the camera system 306 (FIGS. 3-5).

The low level of light reflected from the rear polarizer 640 as light 905c has the incorrect polarization state to pass the front polarizer 615 and remains trapped inside the electronic display 600. Camera system 306 (FIGS. 3-5) that illuminates 904a and detects 905b will observe the corresponding region of the electronic display 600 as a bright area. The specular component 905a will not experience significant diffusion and therefore travels only into the specular angle and away from the camera system 306.

As shown in FIGS. 7 and 8, the TN configuration 721 appears bright in visible reflection but dark in infrared retroreflection. Similarly, as shown in FIG. 9, the VAN configuration 722 appears dark in visible reflection but light in infrared retroreflection. Therefore, a display with black characters and numbers on a white background will be inverted when viewed using infrared light. However, typical ALPR systems are able to carry out optical character recognition with black on white or white on black images and so the image inversion is not a problem.

In one embodiment, when infrared illumination and sensing are oriented close to or at normal incidence then electronic display 600 will show no optical contrast as reflected light 805a, 805b, and 805c will overlap as shown in FIG. 8, and similarly for reflected light 905a and 905b as shown in FIG. 9. In this case, camera system 306 will not be able to recognize the license plate. However, ALPR camera systems, such as camera system 306 (FIGS. 3-5), typically use a series of infrared illumination flashes and camera acquisitions in quick succession. Because camera 309 is typically moving with respect to the license plate, it is highly unlikely that all flash capture events will occur at normal incidence. For occasions when the license plate and camera 309 are static with respect to each other such as at a carpark entry and exit barrier, the camera 309 will always be oriented in a location away from the path of the vehicle.

Therefore, the problem associated with normal incidence illumination and viewing will not compromise the operation of camera system 306 in practice. As an example, a thirty-centimeter-wide license plate viewed at five-meter range will subtend an angle 225 at the camera 309 where $\theta=2\times$ TAN $(0.15/5)=3.44°$. Thus, the near normal incidence angle range 220 over which contrast is lost is very small. This simple calculation assumes that the camera 309 and infrared light sources 307 and 308 are close to each other, but this is always the case in practice because these systems are designed to take best advantage of the retroreflective elements present in standard metal license plates.

Figure 10:
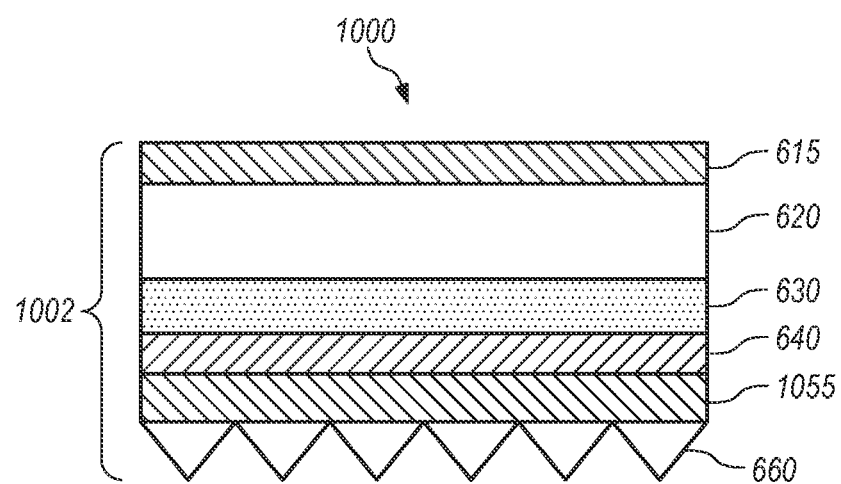
FIG. 10 shows a further exemplary embodiment of an electronic display of the invention.

FIG. 10 shows an alternative embodiment of electronic display 1000 with cross section 1002. Cross section 1002 shares many of the same elements as cross section 602. However, the absorption layer 650 in cross section 602 is replaced with an absorbing polarizer 1055 in cross section 1002 which is oriented such that its transmission axis is orthogonal, meaning oriented ninety degrees plus/or minus about five degrees, to the transmission axis rear polarizer 640. Typical absorbing polarizers such as absorbing polarizer 1055 operate in the visible wavelength range but have little or no absorption in the infrared.

The crossed arrangement of rear polarizer 640 and absorbing polarizer 1055 ensures that no visible light reaches the retroreflecting layer 660, which would otherwise be detrimental to the visible appearance of electronic display 1000. Meanwhile in the infrared wavelength range, absorbing polarizer 1055 becomes substantially transparent allowing light to reach the retroreflecting layer 660, which is vital to providing good license plate visibility to camera system 306.

Figure 11:
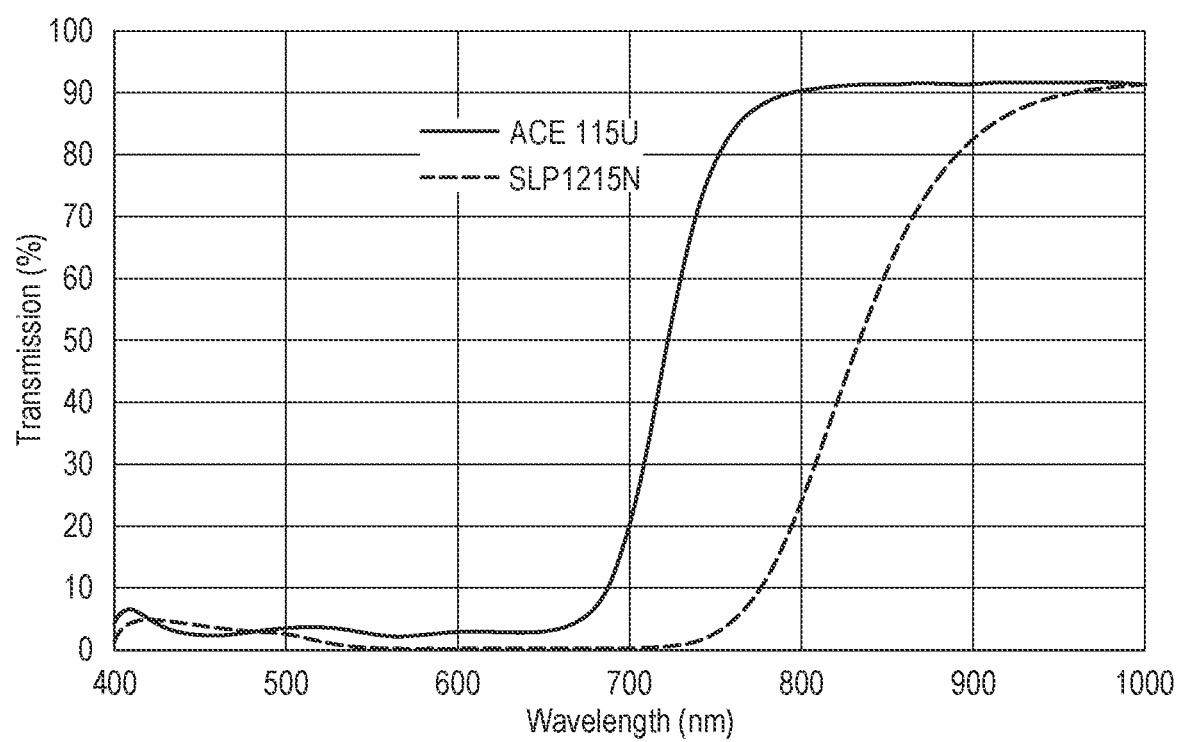
FIG. 11 shows the transmission spectra of example commercial absorbing polarizer pairs.

FIG. 11 shows the transmission through crossed pairs of two example commercial absorbing polarizer materials that can be used in one embodiment for absorbing polarizer 1055. A crossed pair of ACE115U polarizers (from Nippon Kayaku) show a low transmission in the wavelength range of greater than or equal to 400 nanometers and less than or equal to 700 nanometers as is desired for a visible polarizer. Above 700 nanometers, the transmission rises steeply since the aligned dye within the polarizer layers does not absorb in the infrared wavelength range. Another curve shows data for an example crossed pair of SLP1215N polarizers (from Sunnypol). These are iodine-based polarizers, but again the iodine absorption begins to decrease as the wavelength rises above 750 nanometers. The choice of preferred polarizer would depend on the wavelength of the infrared light sources 307 and 308 in camera system 306. The two materials shown here are only examples of a wide range of commercially available materials that can be used.

FIGS. 6-9 show exemplary embodiments of arrangements of optical layers in electronic display 600 with cross section 602, and FIG. 10 in electronic display 1000 with cross section 1002. Those skilled in the art of liquid crystal displays will appreciate that the operation described above or an equivalent operation can be achieved with a variety of other similar optical layers with a range of orientations between each layer, and with polarizer configurations substantially crossed or parallel. In addition, the liquid crystal layer 620 can comprise a wide variety of possible liquid crystal configurations both those that are induced by applied voltages and those that exist without applied voltages. In bistable or multistable systems, several liquid crystal configurations may exist without applied voltages.

Figure 12:
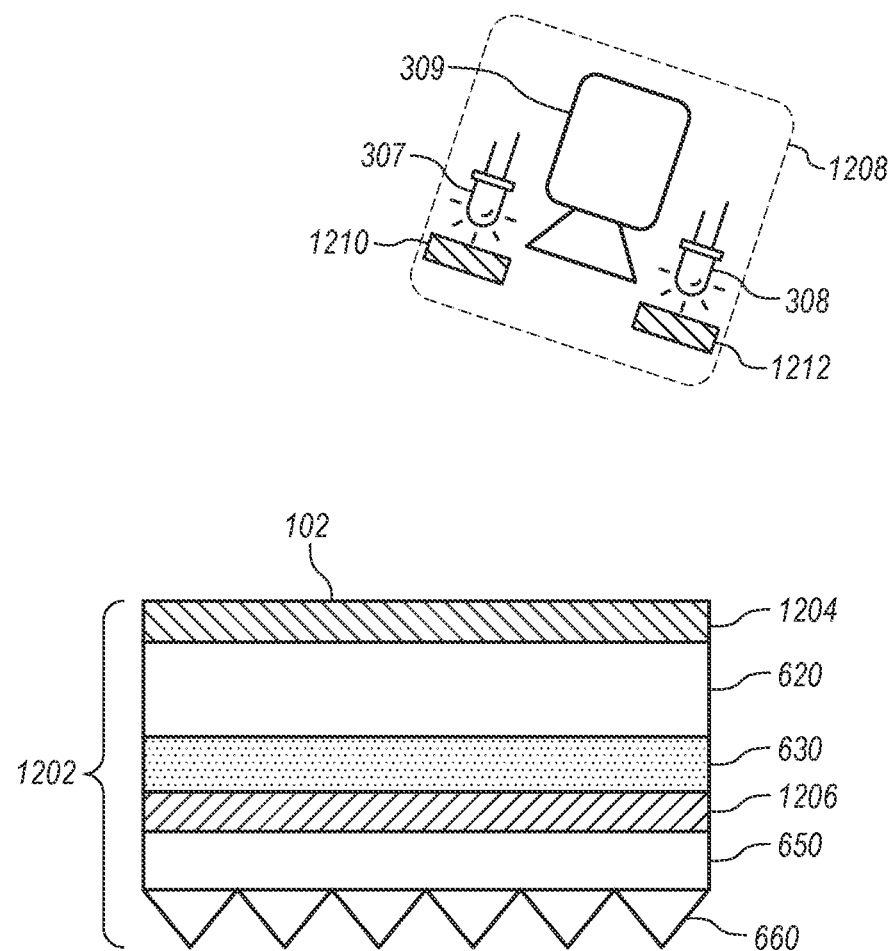
FIG. 12 shows a further exemplary embodiment of an electronic display which is used in conjunction with a camera system.

FIG. 12 shows a further alternative embodiment of electronic display 1200 with cross section 1202 which is used in conjunction with camera system 1208. Cross section 1202 shares many of the same elements as cross section 602. However, front polarizer 615 and rear polarizer 640 in cross section 602 are now replaced by front visible light polarizer 1204 and rear visible light polarizer 1206 that only polarize visible light and are transparent to infrared light. The camera system 1208 now contains two infrared polarizers 1210 and 1212 which are placed in front of the infrared light sources 307 and 308. There can be any number of light sources on the camera system 1208 as long as the light form the camera system 1208 passes infrared polarizers 1210 and 1212.

Infrared polarizers 1210 and 1212 ensure that the electronic display 1200 is only illuminated with polarized light when viewed by the infrared camera 309. However, a combination of the polarized illumination, liquid crystal layer 620 and transmissive diffuser layer 630 will lead to diffusion of the infrared light for the TN configuration 721 of the liquid crystal layer 620, while the VAN configuration 722 of the liquid crystal layer 620 will not cause diffusion. This difference in diffusion alone is sufficient to provide excellent optical contrast when viewed in the retroreflective configuration.

Figure 13:
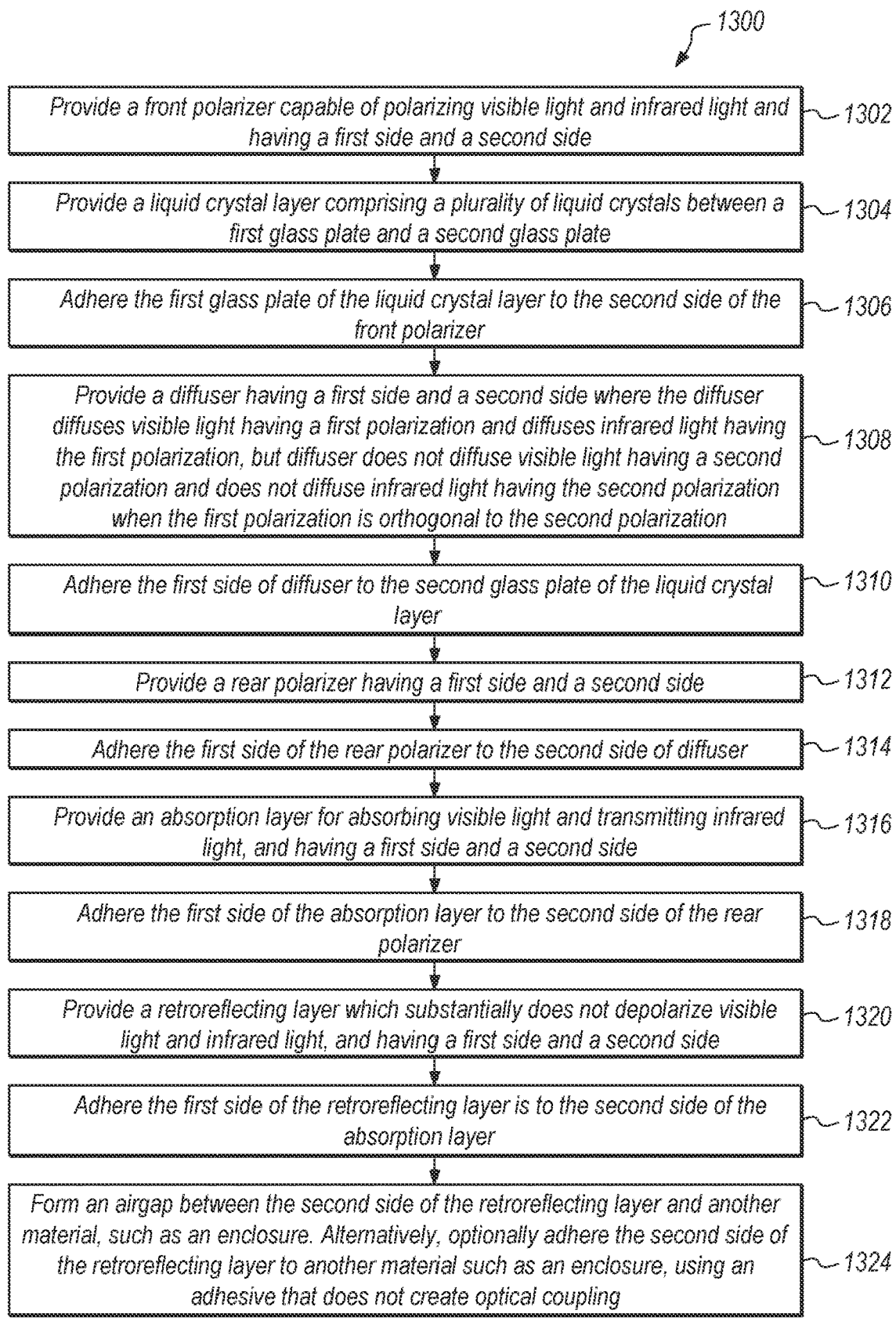
FIG. 13 shows an example embodiment of a process for forming electronic displays with simultaneous reflective and retroreflective properties.

FIG. 13 shows an example embodiment of formation process 1300 for forming electronic displays 600, 1000, and 1200 where the resulting electronic display 600, 1000, or 1200 is diffuse reflective to visible light and non-diffuse retro-reflective to infrared light. At step 1302, a front polarizer, such as front polarizer 615 or front visible light polarizer 1204, and having a first side and a second side, is provided. At step 1304, a liquid crystal layer 620 comprising a plurality of liquid crystals between a first glass plate and a second glass plate is provided. At step 1306, the first glass plate of the liquid crystal layer 620 is adhered to the second side of the front polarizer.

At step 1308, a diffuser 1350 having a first side and a second side is provided. Diffuser 1350 diffuses visible light having a first polarization and diffuses infrared light having the first polarization, but diffuser 1350 does not diffuse visible light having a second polarization and does not diffuse infrared light having the second polarization, where the first polarization is orthogonal to the second polarization. At step 1310, the first side of diffuser 1350 is adhered to the second glass plate of the liquid crystal layer 620.

At step 1312, a rear polarizer, such as rear polarizer 640 or rear visible light polarizer 1206, and having a first side and a second side, is provided. At step 1314, the first side of the rear polarizer is adhered to the second side of diffuser 1350. At step 1316, an absorption layer, such as absorption layer 650 or absorbing polarizer 1055, and having a first side and a second side is provided. At step 1318 the first side of the absorption layer is adhered to the second side of the rear polarizer.

At step 1320, a retroreflecting layer 660 which substantially does not depolarize visible light and infrared light, and having a first side and a second side is provided. And, at step 1322, the first side of the retroreflecting layer 660 is adhered to the second side of the absorption layer 650.

At optional step 1324, an airgap is provided if required by the design of the retroreflector between the second side of the retroreflecting layer 660 and another material such as an enclosure.

In an alternative embodiment, formation process 1300 at step 1324 can also include adhering the retroreflecting layer 660 to another material such as the enclosure using an adhesive that does not create optical coupling.

While the invention has been specifically described in connection with certain specific embodiments thereof, it is to be understood that this is by way of illustration and not of limitation. Reasonable variations and modifications are possible within the scope of the foregoing disclosure and drawings without departing from the spirit of the invention.

What is claimed is:

1. An electronic display that is diffuse reflective to visible light and non-diffuse retro-reflective to infrared light comprising:
   a plurality of optical layers, the plurality of optical layers comprising:
      a front polarizer for polarizing visible light incident on the electronic display and for polarizing infrared light incident on the electronic display;
      a liquid crystal layer comprising a plurality of liquid crystals, wherein:
         the liquid crystal layer introduces a plurality of retardation levels in the visible light; and
         the liquid crystal layer introduces a plurality of retardation levels in the infrared light;
      a transmissive diffuser layer, wherein:
         the transmissive diffuser layer diffuses visible light having a first polarization and diffuses infrared light having the first polarization;
         the transmissive diffuser layer does not substantially diffuse visible light having a second polarization and does not substantially diffuse infrared light having the second polarization; and the second polarization is substantially orthogonal to the first polarization;

a reflective rear polarizer for transmitting the first polarization and reflecting the second polarization;

an absorption layer; wherein:

the absorption layer is transparent to infrared light; and the absorption layer is opaque to visible light; and a retroreflecting layer; wherein the retroreflecting layer reflects visible light and reflects infrared light.

2. The electronic display of claim 1 wherein:

the visible light has a spectral range of greater than or equal to 400 nanometers and less than or equal to 700 nanometers; and the infrared light has a spectral range of greater than or equal to 700 nanometers and less than or equal to 1100 nanometers.

3. The electronic display of claim 1, wherein the front polarizer further comprises:

a visible light absorbing polarizer;

a visible infrared reflective transmissive polarizer; and wherein the visible light absorbing polarizer is located in front of the visible infrared reflective transmissive polarizer.

4. The electronic display of claim 1, wherein the liquid crystal layer operates using a monostable mode.

5. The electronic display of claim 1, wherein the liquid crystal layer operates using a bistable mode.

6. The electronic display of claim 1, wherein the liquid crystal layer operates using a multistable mode.

7. The electronic display of claim 1, wherein the absorption layer contains a dye that is opaque to visible light.

8. The electronic display of claim 1, wherein the absorption layer comprises an absorbing polarizer, and wherein the absorbing polarizer is oriented with a transmission axis orthogonal to a transmission axis of the reflective rear polarizer.

9. The electronic display of claim 1, wherein the retroreflecting layer further comprises a plurality of dielectric stacks.

10. The electronic display of claim 1, wherein the retroreflecting layer comprises a plurality of corner-cube reflectors with total internal reflection.

11. The electronic display of claim 1, wherein the retroreflecting layer comprises a plurality of corner-cube reflectors with mirrored surfaces.

12. The electronic display of claim 1, wherein the retroreflecting layer comprises a plurality of microsphere reflectors with total internal reflection.

13. The electronic display of claim 1, wherein the retroreflecting layer comprises a plurality of microsphere reflector with mirrored surfaces.

14. The electronic display of claim 1, wherein the retroreflecting layer comprises a plurality of hemisphere reflectors employing total internal reflection.

15. The electronic display of claim 1, wherein the retroreflecting layer comprises a plurality of hemisphere reflectors with mirrored surfaces.

16. The electronic display of claim 1, wherein:

the front polarizer is a visible light polarizer;

the reflective rear polarizer is a visible light polarizer; and the electronic display is illuminated with a polarized light from an automatic license plate recognition system.

* * * * *